(12) United States Patent
Kim et al.

(10) Patent No.: US 7,687,201 B2
(45) Date of Patent: Mar. 30, 2010

(54) LITHIUM SECONDARY BATTERY CONTAINING SILICON-BASED OR TIN-BASED ANODE ACTIVE MATERIAL

(75) Inventors: Young-Min Kim, Daejeon (KR); Eun-Suok Oh, Daejeon (KR); Juhyun Kim, Daejeon (KR); Minjung Ryu, Seoul (KR)

(73) Assignee: LG Chem, Ltd. (KR)

( * ) Notice: Subject to any disclaimer, the term of this patent is extended or adjusted under 35 U.S.C. 154(b) by 984 days.

(21) Appl. No.: 11/402,598

(22) Filed: Apr. 12, 2006

(65) Prior Publication Data

US 2006/0257740 A1 Nov. 16, 2006

Related U.S. Application Data

(60) Provisional application No. 60/670,468, filed on Apr. 12, 2005.

(51) Int. Cl.
*H01M 4/62* (2006.01)
*H01M 4/58* (2006.01)

(52) U.S. Cl. .................. 429/213; 429/217; 429/218.1

(58) Field of Classification Search .............. 429/217, 429/213

See application file for complete search history.

(56) References Cited

U.S. PATENT DOCUMENTS

| | | | | |
|---|---|---|---|---|
| 4,684,583 A | * | 8/1987 | Klinedinst et al. | 429/48 |
| 5,521,025 A | * | 5/1996 | Chaloner-Gill | 429/314 |
| 5,565,284 A | * | 10/1996 | Koga et al. | 429/217 |
| 5,846,674 A | * | 12/1998 | Sakai et al. | 429/337 |
| 2004/0229118 A1 | * | 11/2004 | Wensley et al. | 429/162 |
| 2005/0123829 A1 | * | 6/2005 | Fukui et al. | 429/164 |

FOREIGN PATENT DOCUMENTS

| | | |
|---|---|---|
| JP | 10-162832 | 6/1998 |
| JP | 2002-324547 | 8/2002 |
| JP | 2003-157851 | 5/2003 |
| JP | 2005-044681 | 2/2005 |
| WO | WO2004072987 * | 8/2004 |
| WO | WO 2005/011030 A1 | 2/2005 |

* cited by examiner

*Primary Examiner*—Dah-Wei D Yuan
*Assistant Examiner*—Patricia Davis
(74) *Attorney, Agent, or Firm*—Cantor Colburn LLP

(57) ABSTRACT

A lithium secondary battery includes an anode mix including a silicon- or tin-based material as an anode active material, a thermosetting agent, and a curing agent and a curing accelerator as a binder. The anode mix is prepared within a short period of time via a simplified manufacturing process by applying the anode mix to a current collector and heating to cure the applied anode mix at a temperature of less than 200° C.

10 Claims, No Drawings

LITHIUM SECONDARY BATTERY CONTAINING SILICON-BASED OR TIN-BASED ANODE ACTIVE MATERIAL

CROSS REFERENCE TO RELATED APPLICATION

This application claims the benefit of the filing date of U.S. Provisional Application No. 60/670,468, filed on Apr. 12, 2005, the disclosure of which is incorporated herein in its entirety by reference.

FIELD OF THE INVENTION

The present invention relates to a lithium secondary battery containing a silicon- or tin-based anode active material. More specifically, the present invention relates to a lithium secondary battery comprising an anode mix including a silicon- or tin-based active material as an anode active material and a thermosetting material and a curing agent, and preferably further a curing accelerator, as a binder, whereby an anode can be prepared within a short period of time via a simplified manufacturing process by applying the anode mix to a current collector and heating to cure the applied anode mix at a temperature of less than 200° C., and further, superior charge/discharge cycle characteristics of the battery are provided via stable maintenance of binding between active materials and between the active material and current collector, regardless of significant volume changes of the anode active material occurring upon charging/discharging the battery

BACKGROUND OF THE INVENTION

Technological development and increased demand for mobile equipment have lead to a rapid increase in the demand for secondary batteries as an energy source. Among these secondary batteries, a great deal of research and study has been focused on a lithium secondary battery having high energy density and discharge voltage and thus some of such lithium secondary batteries are commercially available and widely used. The lithium secondary battery generally uses a lithium transition metal oxide as a cathode active material and a carbonaceous material as an anode active material.

However, the anode based on the carbonaceous material has a maximum theoretical capacity of only 372 mAh/g (844 mAh/cc), thus suffering from limited increase of capacity thereof. Lithium metals, studied for use as the anode material, have a high energy density and thus may realize high capacity, but raise problems associated with safety concerns due to growth of dendrites and a shortened charge/discharge cycle life as the battery is repeatedly charged/discharged.

For these disadvantages and problems, a number of studies and suggestions have been proposed as to silicon, tin or alloys thereof, as a possible candidate material exhibiting high capacity and being capable of substituting for the lithium metal. For example, silicon (Si) reversibly absorbs (intercalates) and desorbs (deintercalates) lithium ions through the reaction between silicon and lithium, and has a maximum theoretical capacity of about 4200 mAh/g (9366 mAh/cc, a specific gravity of 2.23) that is substantially greater than the carbonaceous materials and thereby is promising as a high-capacity anode material.

However, upon performing charge/discharge processes, silicon, tin or alloys thereof react with lithium, thus undergoing significant changes of volume, i.e., ranging from 200 to 300%, and therefore continuous charge/discharge may result in separation of the anode active material from the current collector, or significant physicochemical changes in contact interfaces between anode active materials, which is accompanied by increased resistance. Therefore, as charge/discharge cycles are repeated, the battery capacity sharply drops, thus suffering from a shortened cycle life thereof. For these reasons, when the binder for a carbon-based anode active material, without any special treatment or processing, is directly applied to a silicon-based anode active material, it is impossible to achieve desired effects.

In order to cope with such problems, a certain prior art has proposed a method for inhibiting lowering of binding force between the current collector and anode active material and/or between anode active materials, resulting from volume changes of the silicon-based anode active material, which uses polyamide acid as a binder and involves applying an anode mix including polyamide acid as the binder to the current collector and heat-treating the applied anode mix at a high temperature (higher than 300° C.), thereby converting polyamide acid into polyimide via imidation. However, this method requires heat-treatment at a high temperature for a prolonged period of time (for example, 10 hours) and thus presents problems associated with remarkably lowered productivity of the battery.

As such, there is an urgent need for the development of battery manufacturing technology which provides strong binding force sufficient to inhibit significant volume changes of anode active materials occurring during a charge/discharge process in lithium secondary batteries using silicon- or tin-based anode active materials and is also economical in terms of a manufacturing process.

Therefore, the present invention has been made to solve the above problems and other technical problems that have yet to be resolved.

As a result of a variety of extensive and intensive studies and experiments to solve the problems as described above, the inventors of the present invention have surprisingly discovered that, in a lithium secondary battery using silicon- or tin-based anode active materials, use of a certain thermosetting material and a curing accelerator as a binder for an anode mix leads to significantly improved charge/discharge characteristics of the battery via a low increase of resistance resulting from less occurrence of interfacial changes between active materials, in spite of significant volume changes in the anode active material occurring upon charging/discharging the battery, and high binding force between active material and current collector, thus inhibiting easy separation therebetween. The present invention has been completed based on these findings.

SUMMARY OF THE INVENTION

In accordance with an aspect of the present invention, the above and other objects can be accomplished by the provision of a lithium secondary battery comprising an anode mix including a silicon- or tin-based active material as an anode active material and a thermosetting material and a curing agent as a binder, wherein binding force between the anode active materials and between the anode active material and current collector is secured by applying the anode mix to a current collector and curing the applied anode mix at a temperature of less than 200° C.

Therefore, the lithium secondary battery in accordance with the present invention utilizes the thermosetting material and the curing agent, as the binder, and imparts superior charge/discharge cycle characteristics by curing the binder material with heat treatment to thereby enhance binding force between silicon- or tin-based anode active materials undergoing significant volume changes upon charging/discharging the battery and/or binding force between the anode active material and current collector.

Due to further inclusion of a curing accelerator in addition to the curing agent, it is possible to induce curing reaction within a short period of time under heating conditions of less than 200° C. and therefore it is advantageous to substantially reduce a manufacturing process time of the anode.

The term "silicon- or tin-based anode active material" is intended to encompass silicon particles, tin particles, silicon-tin alloy particles, silicon alloy particles, tin alloy particles, complexes thereof and the like. Representative examples of the silicon alloys include, but are not limited to, solid solutions, intermetallic compounds and eutectic alloys of Al—Si, Mn—Si, Fe—Si and Ti—Si. As one preferred example of the complex, a silicon/carbon complex may be used and is found in PCT Publication No. WO 2005/011030, assigned to the present applicant, the disclosures of which are incorporated by reference herein in their entirety.

The thermosetting material is a material undergoing curing reaction in the presence of the curing agent, preferably in the presence of the curing agent and curing accelerator, under heating conditions of less than 200° C. For example, the thermosetting material may be in the form of a monomer, an oligomer or a polymer.

For example, the monomer may include, but is not limited to, epoxy group-containing monomers, hydroxyl group-containing monomers or the like. Polymerization of the monomer is initiated with heat treatment in the presence of the curing agent or in the presence of the curing agent and curing accelerator. The oligomer is a polymerization product of about 2 to 20 monomers and may be formed into polymers having a higher degree of polymerization in the presence of the curing accelerator by heating. The polymer may be, for example a linear polymer, a cross-linked polymer or the like, having a low degree of polymerization or low viscosity, and include, but is not limited to, epoxy resin, polyurethane glycol or the like. Therefore, curing as used herein refers to a reaction that can produce binding force between active materials and/or between the active material and current collector, by solidification of the materials concerned, and is a concept covering both polycondensation and cross-linking.

The thermosetting material may be included in a range of about 1 to 30% by weight, preferably 2 to 20% by weight, based on the total weight of the anode mix. If the content of the thermosetting material is too low, it is difficult to achieve desired addition effects. Conversely, if the content of the thermosetting material is too high, this undesirably leads to increased resistance within the anode, thereby deteriorating characteristics of the battery.

The curing agent is a material that triggers curing reaction in conjunction with the thermosetting material, and may be included in a range of about 1 to 30% by weight, preferably 2 to 20% by weight, based on the total weight of the anode mix. The curing agent may include, but is not limited to, acid anhydrides, aliphatic amine compounds, aromatic amine compounds, and cycloaliphatic amine compounds.

The curing accelerator is a material that rapidly initiates the curing reaction between the thermosetting material and curing agent under temperature conditions of less than 200° C. and is used as a catalyst. For example, the curing accelerator may include, but is not limited to, 2-ethyl-4-methylimidazole, 1-(2-cyanoethyl)-2-alkyl imidazole and 2-phenylimidazole. When it is based on a metal component, the curing accelerator itself exhibits conductivity and therefore also contributes to improvement in conductivity of the anode mix.

The temperature for initiation of the curing reaction may vary within the temperature range of less than 200° C., depending upon kinds of the thermosetting material, curing agent and curing accelerator. Generally, temperatures higher than 200° C. require expensive equipment for heating and cooling and result in consumption of large quantities of energy. Further, high temperatures may cause undesirable side reactions. For example, some portions of the already-cured material may decompose into a gaseous phase and remain as pores within the anode mix, thereby remarkably lowering binding strength between the active materials or between the active material and current collector. Whereas, the heating condition proposed in the present invention, i.e., heating below 200° C. exhibits advantages capable of solving all the problems as discussed above.

In addition to the silicon- or tin-based anode active material, thermosetting material, curing agent and curing accelerator as mentioned hereinbefore, the anode mix may further include additional components such as a viscosity adjuster, a conductive material and a filler, which are used alone or in any combination thereof.

The viscosity adjuster is a component adjusting the viscosity of the anode mix such that a mixing process of the anode mix and an application process of the anode mix to the current collector can be easily carried out. The viscosity adjuster may be added in an amount of 0 to 30% by weight, based on the total weight of the anode mix. Examples of the viscosity adjuster may include, but are not limited to, carboxymethyl cellulose and polyvinyl alcohol.

The conductive material is a component used to improve conductivity of the anode active material and may be added in an amount of 0 to 50% by weight, based on the total weight of the anode mix. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The filler is an optional ingredient used to inhibit anode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The secondary battery in accordance with the present invention is fabricated by applying the anode mix to the current collector, followed by rolling and drying.

The anode current collector is generally fabricated to have a thickness of 3 to 500 μm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form fine irregularities on the surface thereof so as to enhance adhesiveness to the anode active material. In addition, the anode current collector may take various forms including films, sheets, foils, nets, porous structures, foams and non-woven fabrics.

Hereinafter, the other remaining components necessary for the lithium secondary battery in accordance with the present invention will be described.

The lithium secondary battery is comprised of an anode fabricated as described above, a cathode, a separator and a non-aqueous electrolyte containing a lithium salt.

The cathode is, for example, fabricated by applying a mixture of the cathode active material, a conductive material and a binder to a cathode current collector, followed by drying. If desired, a filler may be further added to the above mixture.

Examples of the cathode active material that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leqq x \leqq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides of Formula $LiNi_{1-x}M_xO_2$ (M=Co, Mn, Al, Cu, Fe, Mg, B or Ga, and $0.01 \leqq x \leqq 0.3$); lithium manganese composite oxides of Formula $LiMn_{2-x}M_xO_2$ (M=Co, Ni, Fe, Cr, Zn or Ta, and $0.01 \leqq x \leqq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The cathode current collector is generally fabricated to have a thickness of 3 to 500 µm. There is no particular limit to the cathode current collector, so long as it has high conductivity without causing chemical changes in the fabricated battery. As examples of the cathode current collector, mention may be made of stainless steel, aluminum, nickel, titanium, sintered carbon and aluminum or stainless steel which was surface-treated with carbon, nickel, titanium or silver. The current collector may be fabricated to have fine irregularities on the surface thereof so as to enhance adhesiveness to the cathode active material. In addition, the current collector may take various forms including films, sheets, foils, nets, porous structures, foams and non-woven fabrics.

The binder for the cathode active material is a component assisting in binding between the active material and conductive material, and in binding with the current collector. The binder utilized in the present invention is typically added in an amount of 1 to 50% by weight, based on the total weight of the cathode mix. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

Details of other conductive material and filler were the same as in the anode.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The non-aqueous electrolyte containing lithium salt is composed of a non-aqueous electrolyte and lithium. As the non-aqueous electrolyte, a non-aqueous electrolyte solution, organic solid electrolyte, inorganic solid electrolyte, etc. may be utilized.

As the non-aqueous electrolyte solution, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydro Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

As examples of the organic solid electrolyte utilized in the present invention, mention may be made of polyethylene derivatives, polyethylene oxide derivatives, polypropylene oxide derivatives, phosphate polymers, poly agitation lysine, polyester sulfone, polyvinyl alcohol, poly(vinylidene fluoride), polymers containing ionic dissociation groups, etc.

As examples of the inorganic solid electrolyte utilized in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc.

The lithium salt is a material that is readily soluble in non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenyl borate, imide, etc.

Additionally, in order to improve charge/discharge characteristics and flame retardancy, for example, pyridine, triethylphosphite, triethanolamine, cyclic ether, ethylene diamine, n-glyme, hexamethylphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride and the like may be added to the non-aqueous electrolyte. If necessary, in order to impart incombustibility, the non-aqueous electrolyte may further include halogen-containing solvents such as carbon tetrachloride and ethylene trifluoride. In addition, the non-aqueous electrolyte may further include carbon dioxide gas in order to improve high temperature preservability.

EXAMPLES

Now, the present invention will be described in more detail with reference to the following examples. These examples are provided only for illustrating the present invention and should not be construed as limiting the scope and spirit of the present invention.

[Examples 1 through 3]

A silicon-carbon material complex (Si—C) as an anode active material, a mixture of a thermosetting material and a curing agent and optionally a curing accelerator, as listed in Table 1 below, and 2% by weight of carbon black powder as a conductive material were mixed, thereby preparing an anode mix. Then, 100 parts by weight of N-methyl pyrrolidone (NMP) as a solvent were added relative to 100 parts by weight of the anode mix. The resulting mixture was stirred for about 30 min to prepare a slurry for an anode. The slurry thus obtained was applied in a thickness of about 90 μm to copper (Cu) foil having a thickness of 18 μm and was subjected to first curing and post-curing under conditions given in Table 1 below to thereby prepare an anode.

A lithium cobalt oxide as a cathode active material, polyvinylidene fluoride (PVDF) as a binder and 3% by weight of carbon black powder as a conductive material were mixed to thereby prepare a cathode mix. Then, 200 parts by weight of NMP were added relative to 100 parts by weight of the cathode mix. The resulting mixture was stirred for about 30 min to prepare a slurry for a cathode. The slurry thus obtained was applied in a thickness of about 90 μm to aluminum (Al) foil having a thickness of 18 μm and thereafter the solvent was heat-dried at a temperature of 130° C. for 1 hour to prepare a cathode.

A porous film made of polypropylene was interposed between the anode and cathode thus prepared as above, and an EC:EMC (1:2) electrolyte containing 1M $LiPF_6$ was added thereto to prepare a coin cell.

[Comparative Example 1]

A coin cell was prepared in the same manner as in Example 1, except that an anode was fabricated using a phenolic resin (PHENOLITE™, Dai-Nippon Ink &. Chemicals Inc.) as a binder and ethanol as a solvent.

[Comparative Example 2]

A coin cell was prepared in the same manner as in Example 1, except that an anode was fabricated using, as a binder, a mixture of a thermosetting polyvinyl alcohol, an acrylic resin-based plasticizer and NMP as a solvent, as disclosed in Example 1 of Japanese Patent Laid-open Publication No. 2003-157851.

[Comparative Example 3]

A coin cell was prepared in the same manner as in Example 1, except that an anode was fabricated using a mixture of urethane (meth)acrylate, prepared using isophorone diisocyanate, polyethylene glycol and hydroxy ethyl acrylate, and methoxy polyethylene glycol monoacrylate in a weight ratio of 4:1, as a binder, and 2'-azobis(4-methoxy-2,4-dimethylvaleronitrile) as a thermal polymerization initiator.

TABLE 1

|  | Ex. 1 | Ex. 2 | Ex. 3 | Comp. Ex. 1 | Comp. Ex. 2 | Comp. Ex. 3 |
|---|---|---|---|---|---|---|
| Curable monomer (wt %) | LER-673 (10) | N-865 (12) | ECH (17) | Phenolic resin | As defined above | As defined above |
| Content of anode active material (wt %) | 77.9 | 76 | 76 | 76 | 76 | 73 |
| Curing agent (wt %) | VH-4290 (10) | DETA (10) | PCL308 (5) | — | — | As defined above |
| Curing accelerator (wt %) | 2-ethyl-4-methyl imidazole (0.1) | — | — | — | — | — |
| Curing condition | 150° C. 10 min | 150° C. 10 min | 70° C. 60 min | 150° C. 10 min | 150° C. 10 min | 150° C. 10 min |
| Post-curing condition | 190° C. 3 hrs | 190° C. 3 hrs | 160° C. 3 hrs | 190° C. 3 hrs | 190° C. 3 hrs | 190° C. 3 hrs |
| Solvent | MEK | MEK | MEK | Ethanol | NMP | NMP |
| 50-Cycle Eff. (%) | 84 | 83 | 77 | 32 | 55 | 63 |

LER-673: Multifunctional epoxy resin (available from Bakelite)
VH-4290: Bisphenol A-type novolac phenolic curing agent (available from KANGNAM CHEMICAL Co., Ltd., Korea)
N-865: Bisphenol A-type epoxy resin (available from DIC)
DETA: Diethylenetriamine
ECH: 3,4-epoxycyclohexylmethyl-3',4'-epoxycyclohexane carboxylate
PCL308: Polycaprolactone triol (available from DAICEL CHEMICAL INDUSTRIES, LTD.)

As can be seen from Table 1, cells of Examples 1 through 3 using the binder in accordance with the present invention exhibited at least more than 77% capacity retention even after 50 charge/discharge cycles, as compared to the initial capacity. This is because significant volume changes of the anode active material, i.e., silicon-carbonaceous material complex (Si—C), occurring upon charging/discharging, are inhibited by strong binding force of the binder in accordance with the present invention and therefore interfacial changes between active materials are also greatly inhibited, thereby leading to less increased resistance, and separation of the active material from the current collector is prevented due to high binding force therebetween. In contrast, it was confirmed that cells of Comparative Examples 1 and 3 exhibited substantially decreased capacity because the binder used therein has failed to withstand such significant volume changes of the anode active material.

INDUSTRIAL APPLICABILITY

As apparent from the above description, a lithium secondary battery in accordance with the present invention can be manufactured into a large-capacity lithium secondary battery via use of a silicon- or tin-based anode active material. Further, the lithium secondary battery of the present invention exhibits superior charge/discharge cycle characteristics by stably maintaining binding force between active materials and between the active material and current collector in spite of significant volume changes in the anode active materials occurring upon charging/discharging the battery, via use of an epoxy-based thermosetting material and curing agent and/or a curing agent and curing accelerator, as a binder of an anode mix, and enables preparation of the anode within a short period of time by a simplified manufacturing process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising an anode mix including a silicon- or tin-based active material as an anode active material and a thermosetting material and a curing agent as a binder, wherein a binding force between the anode active material and between the anode active material and a current collector is secured by applying the anode mix to a current collector and heating to cure the anode mix applied to the current collector,
wherein the anode mix further includes a curing accelerator, and the anode mix is applied to the current collector and heat-cured at a temperature of less than 200° C., and
wherein the curing accelerator is added in a catalytic amount, and is 2-ethyl-4-methylimidazole, 1-(2-cyanoethyl)-2-alkyl imidazole or 2-phenylimidazole.

2. The battery according to claim 1, wherein the silicon- or tin-based anode active material comprises silicon particles, tin particles, silicon-tin alloy particles, silicon alloy particles or tin alloy particles or complex thereof.

3. The battery according to claim 2, wherein the silicon alloy is a solid solution, intermetallic compound or eutectic alloy of Al—Si, Mn—Si, Fe—Si or Ti—Si.

4. The battery according to claim 1, wherein the thermosetting material is a monomer, oligomer or polymer which undergoes thermal polycondensation and/or thermal crosslinking.

5. The battery according to claim 1, wherein the monomer is an epoxy group-containing monomer or a hydroxyl group-containing monomer, and the polymer is an epoxy resin or a polyurethane glycol.

6. The battery according to claim 1, wherein the thermosetting material is in a range of 1% to 30% by weight, based on a total weight of the anode mix.

7. The battery according to claim 1, wherein the curing agent is in a range of 1% to 30% by weight, based on a total weight of the anode mix.

8. The battery according to claim 7, wherein the curing agent is an acid anhydride, an aliphatic amine compound, an aromatic amine compound, or a cycloaliphatic amine compound.

9. The battery according to claim 1, wherein the anode mix further includes one or more additional components selected from the group consisting of a viscosity adjuster, a conductive material and a filler.

10. The battery according to claim 1, wherein the anode current collector has a thickness of 3 μm to 500 μm and fine irregularities formed on the surface thereof.

* * * * *